Feb. 21, 1950          A. E. LE VAN          2,498,087
UNITARILY MOUNTED ELECTRICAL MEASURING INSTRUMENT
Filed April 12, 1946          3 Sheets-Sheet 1
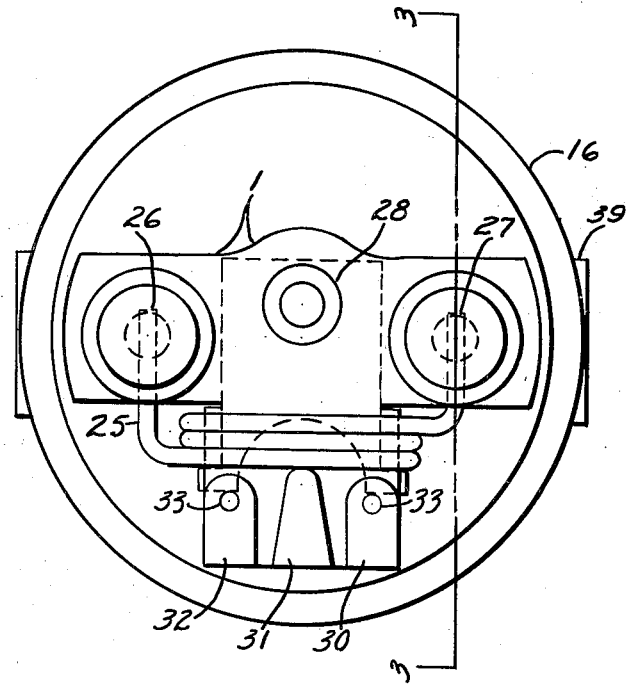
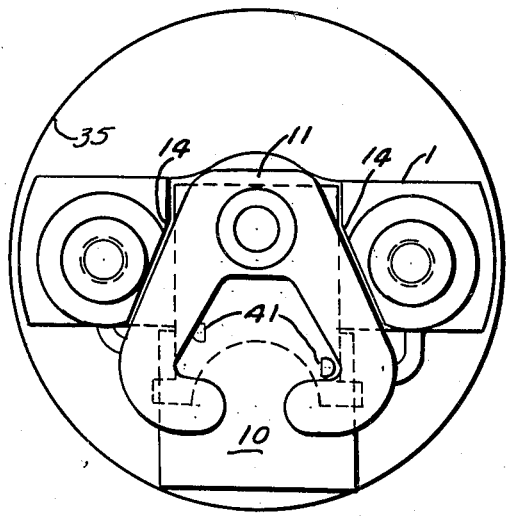
AMBROSE E. LeVAN, INVENTOR.
BY Bruno C. Lechler
Attorney Feb. 21, 1950     A. E. LE VAN     2,498,087
UNITARILY MOUNTED ELECTRICAL MEASURING INSTRUMENT
Filed April 12, 1946     3 Sheets-Sheet 2

AMBROSE E. LEVAN INVENTOR.

BY

Bruno C. Lechler
Attorney

Patented Feb. 21, 1950

2,498,087

UNITED STATES PATENT OFFICE 2,498,087

UNITARILY MOUNTED ELECTRICAL MEASURING INSTRUMENT

Ambrose E. Le Van, Sellersville, Pa., assignor to American Machine and Metals, Inc., New York, N. Y., a corporation of Delaware Application April 12, 1946, Serial No. 661,900

6 Claims. (Cl. 171—95)

The invention relates to an improved electrical measuring instrument and the mounting of the same in a panel.

More specifically, the invention relates to an instrument in which the intensity of the voltage or current is indicated by the position which a pivoted soft iron vane assumes relative to an electromagnet field and a magnetic field at right angles to each other. One of these fields is constant, being created by a stationary U-shaped permanent magnet. The other field is variable, induced by an electromagnetic coil through which the current flows.

Such instruments are used in large numbers and it is desirable to produce instruments of a high degree of accuracy at a low cost. The invention teaches means for securing a close alignment of the several parts without taking any measurements or making adjustments during assembly. This is achieved by using the minimum number of fastenings which further reduces assembly labor.

The parts are so made that they will be correctly aligned when they are placed in the recesses in a molded part. Thus, one fastener instead of two or three holds the parts in proper position.

Further, the parts are so arranged that the few threaded parts which are used serve several functions, such as terminal posts, anchoring the parts of the instrument together, and fastening the instrument in the instrument case.

A cheap but accurate instrument can be produced by mounting a permanent magnet on a molded piece and winding a coil on two projecting arms of the molded piece so that the fields of the permanent magnet and the coils will be at right angles to each other, then mounting a small statically balanced soft iron vane carried on a pivoted spindle so as to be subject to both the magnetic and the electromagnetic fields at the same time.

The object of the invention is to build a cheap but rugged instrument not apt to get out of order or to be affected by external pressure on the case.

A further object is to seal the rear end of the casing against moisture by crowding a soft washer into the threads of the studs.

A further object of the invention is to mount all of the parts on a single molded body which is supported as a unity in a case.

A further object of the invention is to mount all of the essential parts of the instrument on a molded piece which carries two studs which serve both as leads to the instrument, as means for attaching the case to the molded body and as means for attaching the instrument to a panel board.

Figure 1 is a front view of the instrument, mounted in a case with the dial and the pointer removed.

Figure 2 is a rear view of the indicating instrument, dial attached, and case removed.

Figure 3:
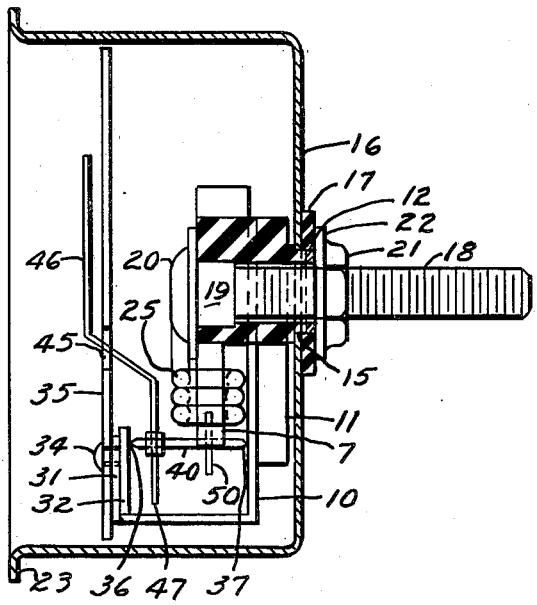
Figure 3 is a vertical section of the instrument shown mounted in its case.
Figure 4:
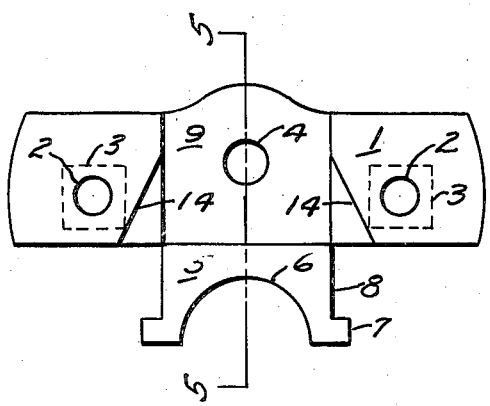
Figure 4 is a back view of the molded body piece.
Figure 5:
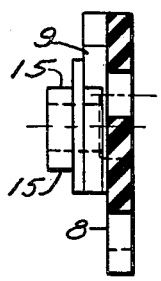
Figure 5 is a section through the body piece shown in Figure 4 along line 5—5.
Figure 6:
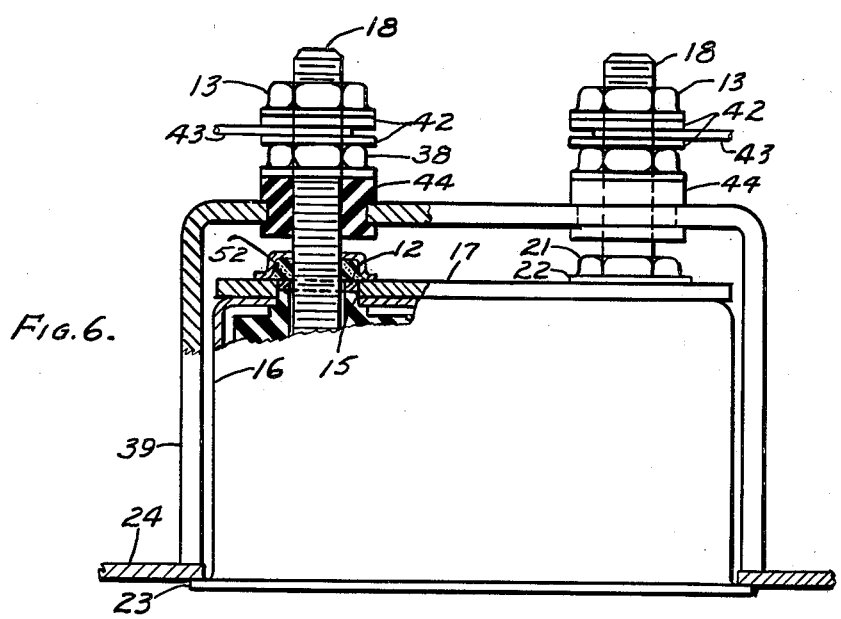
Figure 6 is a top elevation of instrument, partly in section, mounted on a panel.
Figures 7, 8:
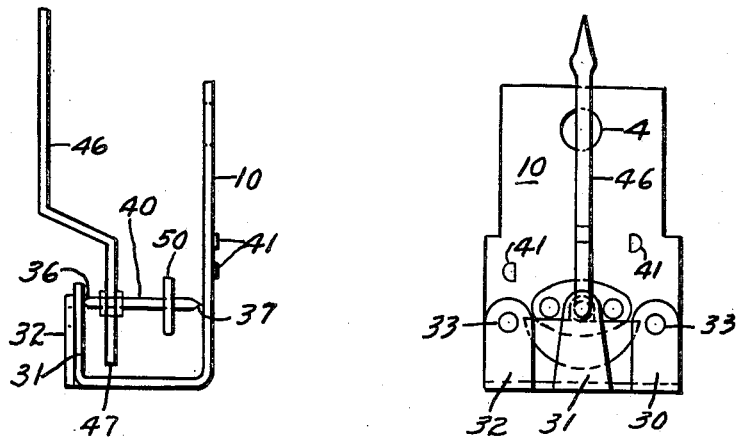
Figure 7 is a side elevation of pointer shaft in its mounting.
Figure 8 is a front view of pointer and its mounting.

1 indicates, generally, a molded piece which forms the base of the entire assembly. This piece has the general shape of a rectangular bar through which pass two holes 2. On one side of the piece the holes 2 are enlarged to a square section 3. A hole 4 is provided for the assembly with other pieces. A flat portion 5 extends out to one side of the main bar section. A portion of this flat portion is cut away forming a circular arc 6 which acts as a guard for the soft iron vane attached to the spindle which swings within this arc. Two projections 7 serve to anchor the electrical coil 25 on the molded piece which is wound about the portion 8 of the molded piece. A rectangular groove 9 extends across the bar section of this molded piece in line with the flat portion 5. This groove serves to align during assembly the brass support 10 for the moving parts. The sides of the groove are also cut away at 14 to line up the shanks of the stationary permanent magnet 11. Surrounding the holes 2 in the molded piece are raised flanges 15. The case 16 which houses the instrument has holes which fit over these flanges 15. An insulating strip 17 which extends across the back of the case has holes which permit its being aligned by the same flanges 15.

A coil 25 is carried by the flat portion 5 of the molded piece. The ends of this coil are soldered at 26 and 27 respectively, to the heads of the two studs 18 which have square shanks 19. Retaining nuts 12 on studs 18 hold the shanks snugly in place.

All of the movable parts are mounted on a bent brass support 10. This brass piece has the shape of a U. The long leg is adapted to fit into the groove 9 of the molded piece. When a single grommet 28 is passed through a hole in this piece and through hole 4 of the molded piece the entire brass plate is held in proper alignment relative to the molded piece.

That part of the brass plate which corresponds to the shorter leg of the U is divided into three portions 30, 31, 32. The outer portions 30 and 32 are threaded at 33 for small screws 34. These screws hold the dial 35 in place. It will be noted that the dial is supported on the molded piece and is not connected directly with the case. Hence it is not affected by any distortion of the case in mounting. The pivot ended spindle 40 is supported in depressions. One depression 37 is on the long side of the piece 10. The other depression 36 is on the center portion of the leg 31. The long leg of the brass plate 10 also has two raised portions 41. These raised portions 41 are sheared tabs projecting slightly at their ends above the surface of piece 10. These are so placed that in cooperation with the grommet 28 and the cutaway portion 14 in the molded piece the permanent magnet 11 is held in its proper position relative to coil 25 with only the single grommet 28 fastening it in place.

Dial 35 is slotted at 45 to allow a pointer 46 which is attached to the spindle 40 to pass through to the other side of the dial. This pointer may carry a balancing tail section 47 to eliminate the effect of gravity on the position of the pointer.

It will be seen that the soft iron vane 50 which is also carried by the spindle is subject to both the fixed field of permanent magnet 11 and the variable field of coil 25 depending upon the amount of current passing through the coil. Spindle 40, in static balance in all positions, will take that position which corresponds to the resultant of the magnetic and electromagnetic field.

The case may be simply mounted on a panel 24 by providing the panel with circular openings of the diameter of the case 16. A flange 23 extending out from the front of the case prevents the case from passing through the panel. A U-shaped bar 39 having two holes aligned with the studs 18 may be placed over the instrument assembly complete with its case after it has been mounted in the panel. The holes in the U-shaped bar are bushed with an insulating material 44 to prevent shorting of the two studs. Nuts 38 and stud 18 may be used to hold the case in place.

Electrical connections to the outside are made by placing on the studs 18 washers 42 hooking the wire 43 around the studs, adding another washer 42 and then screwing on a nut 13 which backs up against the previously described nuts which hold the case in place.

When this instrument is assembled the threaded studs 18 are inserted into the molded piece 1 so that the square shanks 19 enter the square sections 3 of the two holes 2. A retaining nut 12 is screwed on the studs holding the studs in place against endwise movement or rotation during assembly. The coil 25 is now wound on the portion 8 of the molded piece. Each end of the coil is soldered to the head 20 of one of the studs 18.

As a separate assembly operation, the pointer 46 has been attached to the spindle 40. The soft iron vane 50 is also attached to the spindle. The spindle, carrying both the pointer and the soft iron vane, is now mounted in the brass plate 10 so that one end of the spindle finds a bearing in a depression 37 on the long leg of brass plate 10 and the other end of the spindle finds a bearing in the depression 36 on the center leg of the brass plate.

The dial 35 is slipped over the pointer 46 so that the pointer extends through the slot 45. The dial 35 is now attached to the outer legs 30 and 32 of the brass plate with small screws 34.

Returning now to the molded piece, the brass plate 10 carrying the spindle with its moving part is placed in the groove 9 in the bar.

The permanent stationary magnet 11 is now picked up and placed against the raised portion 41 of the brass plate. A grommet 28 is now passed through the brass plate, the permanent magnet, and the molded piece and staked. All of the operating parts are now mounted on the molded piece.

The flanges 15 of the molded piece are now passed through holes in the case 16. An insulating strip 17 is placed on the outside of the case so that the two holes therein fit across the shoulders 15 projecting from the back of the case.

Soft rubber washers 52 are slipped over the studs 18 during assembly. The hollow nuts 21 with flanges 22 are screwed down on the studs. The conical inner surface extends over the washer 52 crowding the washer against the threads of the stud and against the insulating strip 17. In this manner leakage of moisture into the interior of the case either along the surface of the stud or between the flange and the casing is prevented.

When the instrument is assembled on a panel, the U-shaped bar 39 is slipped over the two studs 18 so that the insulating bushing 44 prevents electrical contact with either of the studs. Nuts 38 are now applied to the studs and as these nuts bear against the U-shaped bar 39, the entire instrument, including its case, is rigidly held in place in a circular hole in the panel.

Washers 42 are now placed on the studs and the electrical connection is made by twisting the end of each of the terminals around its stud. Another washer is applied and still another nut applied to the stud and drawn up against the washer, thus holding the electrical connection in place.

The invention provides a simple method of assembling an electrical instrument. This assembly is made as a complete entity without regard to the case. Two threaded studs, by successively applying washers, are made to function both as inside terminals; as means of holding the instrument in its case, as means for holding the case and the instrument in the panel, and lastly as means for making the outside electrical connection.

It will be understood that the invention is not limited to the precise form of the instrument as shown by way of illustration.

What I claim is:

1. In an electrical instrument of the vane type, in combination, a spindle, a soft iron vane attached to said spindle, a brass plate movably supporting said spindle to one side of the plate, a stationary permanent U-shaped magnet whose poles are symmetrically placed to the spindle axis, but on the opposite side of the brass plate, a flat electrical coil into which one end of the soft iron vane is adapted to swing, terminals for the instrument, a single molded piece having recesses which support and align said brass plate, and the U-shaped magnet and terminals and projecting arms passing through the coil and locating it.

2. In an electrical measuring instrument, in combination, an insulating molded block, two binding posts supported in the molded piece, a flange on the block surrounding each binding post, a metal casing having two holes through which said flanges project, an insulating strip outside said casing having holes also aligned in said flanges, a soft rubber washer on each of said binding posts, a hollow flanged nut whose internal surface is conical and adapted to crowd said washer against threads, flange, and insulating piece, thus both anchoring the casing and preventing the admission of moisture.

3. In a measuring instrument, in combination, two threaded studs which serve as binding posts, a molded piece carried by said studs and adapted to support all the operating parts of the instrument, flanges projecting from the surface of the molded piece surrounding said studs, a cup-shaped metal housing for the instrument having holes through which said flanges project, soft rubber washers that fit over the binding posts, means including a conical cup shaped nut facing toward the flange movable on the binding posts for crowding said washers against said flange so that the rubber flows over the flange against the outer surface of the casing forming a moisture seal.

4. In an electrical instrument, in combination, a permanent magnet generally V-shaped, a pointer carrying spindle assembly mounted on a non-magnetic stamping, a metal casing having two holes, binding-post screws having square shanks passing thru said holes, a unitary molded piece supporting the screws against rotation and locating the assembled mechanism in the casing by said holes in the casing and serving to insulate the binding posts therefrom, said molded piece having recesses that locate the magnet and the spindle assembly in their correct relative position; a single fastener passing thru holes in the stamping, the molded piece, and the magnet and holding all in rigid and precise alignment.

5. In an electrical instrument, in combination, a permanent magnet generally V-shaped, a pointer carrying spindle assembly mounted on a non-magnetic stamping, a rectangular electrical coil, a metal casing having two holes, binding-post screws having square shanks passing thru said holes, a unitary molded piece supporting the screws against rotation, locating the assembled mechanism in the casing by said holes in the casing and insulating the binding posts therefrom, said molded piece having recesses that locate the magnet and the spindle assembly in their correct relative position and having projecting fingers passing thru said coil and locating it relative to the other parts, a single fastener passing thru holes in the stamping, the molded piece, and the magnet and holding all three in rigid assembly.

6. In combination, an instrument panel having a circular opening, a cup-shaped metal casing in the opening, a flange on the casing bearing against the face of the panel and two holes in the back of the casing, a U-shaped piece bearing against the back of the panel, two grommets mounted in holes on the U-shaped piece, an electrical instrument which includes a molded piece located in the casing, terminal screws supported by said molded piece passing through said hole in the rear of said casing and through said grommets, nuts on the terminal screws outside the casing drawing the instrument against the back of the casing, other nuts on the terminal screws bearing against said grommets drawing the entire casing flange against the face of the panel opening.

AMBROSE E. LE VAN.

REFERENCES CITED

The following references are of record in the file of this patent:

UNITED STATES PATENTS

| Number | Name | Date |
| --- | --- | --- |
| 1,220,587 | Beede | Mar. 27, 1917 |
| 1,315,781 | Le Baron | Sept. 9, 1919 |
| 1,393,737 | Ballman | Oct. 18, 1921 |
| 1,428,743 | Ballman | Sept. 12, 1921 |
| 1,630,908 | Scott et al. | May 31, 1927 |
| 1,697,369 | Rodanet | Jan. 1, 1929 |
| 1,919,504 | Eshbaugh | July 25, 1933 |
| 2,426,800 | Triplett | Sept. 2, 1947 |